Dec. 11, 1962

D. A. DISPENZA 3,068,439

ARRANGEMENT WHEREBY THE RESISTANCE VALUE OF A
POTENTIOMETER WILL VARY IN ACCORDANCE WITH
A PREDETERMINED MATHEMATICAL FUNCTION

Filed Jan. 16, 1961

DANIEL A. DISPENZA
INVENTOR.

BY S. A. Giarratana
George B. Amparo

ATTORNEYS

DANIEL A. DISPENZA
INVENTOR.

United States Patent Office 3,068,439
Patented Dec. 11, 1962

3,068,439
ARRANGEMENT WHEREBY THE RESISTANCE VALUE OF A POTENTIOMETER WILL VARY IN ACCORDANCE WITH A PREDETERMINED MATHEMATICAL FUNCTION
Daniel A. Dispenza, Paramus, N.J., assignor to General Precision Inc., Little Falls, N.J., a corporation of Delaware
Filed Jan. 16, 1961, Ser. No. 82,855
3 Claims. (Cl. 338—89)

The present invention relates to a variable function potentiometer and more particularly to the production of an adjustable sinusoidal output from a standard one turn potentiometer.

Physically, a potentiometer or pot is a circular device with terminals at the beginning and the end point. A third terminal known as the wiper travels between the other terminals. The circular path of travel may be over solid material, e.g., carbon, or may be over wire windings. Both linear and non-linear pots are sold commercially. In the case of a linear pot, the resistance will increase or decrease uniformly as the wiper travels over the pot, depending on its direction of travel. Thus, the output of a voltage drop across such a pot could be represented graphically as a straight line. E.g., if a pot is to vary one ohm per degree of mechanical rotation, at the theoretical 0° mechanical position the reading should be zero ohms and each degree position intermediate 0° and 360° should furnish the corresponding resistance value. A non-linear pot output voltage will vary so that a graph of the output is not a straight line, e.g., the output may be depicted graphically as an increasing sinusoidal function. At present, there is no such thing as a universal pot, and to obtain a non-linear output from a linear pot, such as a sinusoidal function, extremely complicated circuitry must be employed. Even if the output of a pot is a sine wave, it is not possible to adjust the pot so as to change the wave configuration. Although many attempts were made to overcome the foregoing difficulties so as to provide a variable resistance function output from a single pot, none, as far as I am aware, have been entirely successful in doing this in a simple efficient manner without considerable complicated circuitry.

It has now been discovered that it is possible to provide various mathematical functions from a standard potentiometer.

Thus, it is an object of the present invention to provide an arrangement to be used in combination with a standard potentiometer which will vary the resistance of the potentiometer in accordance with a predetermined mathematical function particularly as a sinusoidal function as the potentiometer moves from the theoretical 0° position to the theoretical 360° position.

With the foregoing and the other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

The accompanying drawings, illustrative of one embodiment of the invention, together with the description of the construction and method of operation and utilization thereof will serve to clarify further objects of my invention. Other advantages will become apparent from the following description taken in conjunction with the accompanying drawing in which.

Figure 1A:
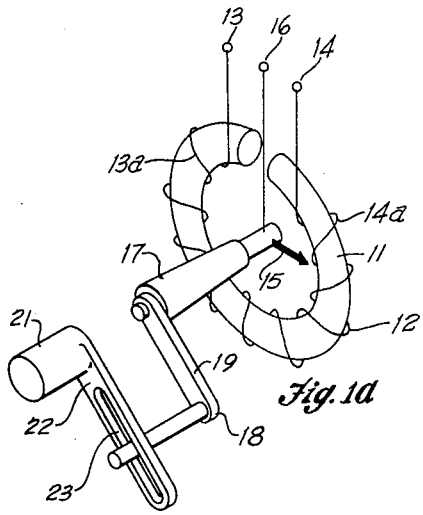
FIG. 1a is a perspective view of the principal components useful in connection with the contemplated invention to provide the resistance function shown in FIG. 1b.

Shown in the drawing is a conventional linear wire wound pot 11 having winding 12 and terminals at the beginning or theoretical zero point 13 and at the end or theoretical 360° point 14. The pot has the usual wiper 15 and a wiper terminal 16. The wiper is rotated by shaft 17. The pot just described is commercially available from many sources. If the current is entering at terminal 13, when the wiper 15 is in the vicinity of point 13a near terminal 13, the current travels directly from terminal 13 down the wiper to wiper terminal 16 and little or no resistance is provided by the pot. As the wiper 15 is rotated by shaft 17 from point 13a to 14a near terminal 14, the current travels more and more along the resistance winding 12 until the maximum point 14a. The increase in resistance is linear as shaft 17 rotates.

Figure 1B:
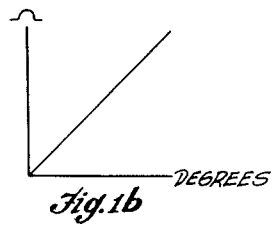
Figure 2A:
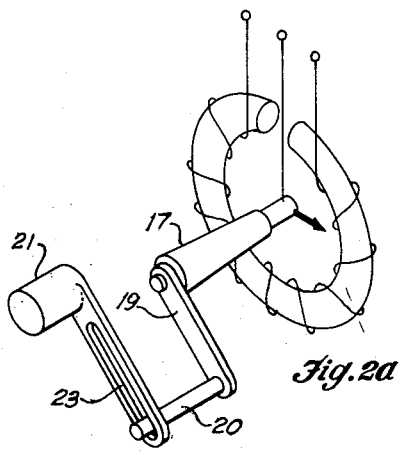
FIG. 2a shows a perspective view similar to FIG. 1a demonstrating the adjustability of the arrangement contemplated herein to provide the sinusoidal resistance function shown in FIG. 1b.

In order to have the increase in resistance vary sinusoidally, there is provided on pot shaft 17 a crank 18 having a crank arm 19 at right angles to shaft 17 and a crank handle 20 parallel to shaft 17. Associated with shaft 17 and crank 18 is a driving shaft 21 having driving element 22 at right angles thereto. In driving element 22 is a slot 23. Crank handle 20 is retained in slot 23. When, as shown in FIG. 1, shaft 21 and shaft 17 are axially aligned, crank handle 20 will turn at a uniform speed through 360° when shaft 21 and slotted arm 22 turn through this angle. When as shown in FIG. 2, shaft 21 is in a plane parallel to, but axially displaced from shaft 17, the rotational speed of shaft 17 will vary sinusoidally as shaft 21 rotates uniformly through 360°.

In carrying the invention into practice therefore, there is provided a cylindrical housing 30. Mounted at one end of this housing 30 is a pot 31 having a resistance element 32, low point terminal 33 and high point terminal 34. There is provided the usual wiper 35 and wiper terminal 36. Wiper 35 is rotated by a shaft 37. The axial disposition of pot 31 in cylindrical housing 30 is adjustable by means of screw 45. The pot can thus be axially centered in the housing or axially displaced from the housing axis by turning of screw 45. Mounted on shaft 37 is a crank element, e.g., crank 38 with crank arm 39 at right angles to shaft 37 and crank handle 40 parallel to shaft 37. Entering through the other end of housing 30 is driving shaft 41 having driving element 42 at right angles thereto. Element 42 of course has a vertical slot 43 retaining crank handle 40. A guide 44 is also provided to guide the adjustment of the pot in the housing. It is evident, therefore, that the arrangement mounted in housing 30 can provide either the linear function of FIG. 1b, or the sinusoidal function of FIG. 2b by merely adjusting screw 45.

Figure 2B:
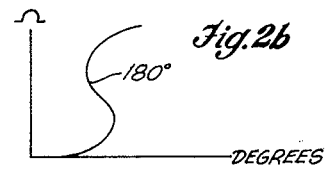
Figure 5A:
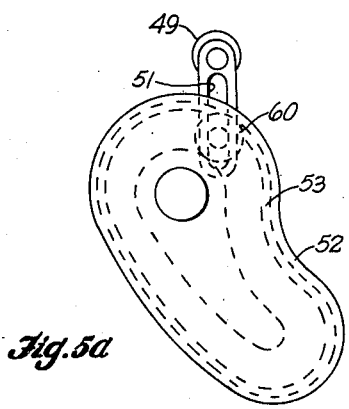
FIG. 5a illustrates an arrangement to provide a particular function shown graphically in FIG. 5b.
Figure 5B:
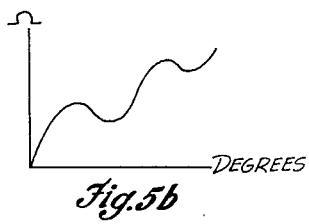
Figure 4:
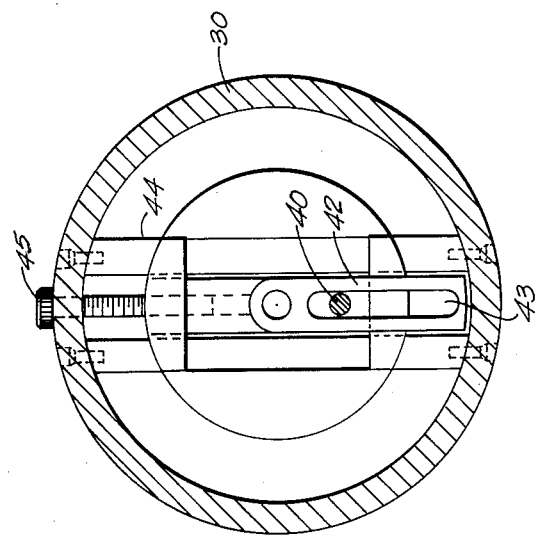
FIG. 4 is a section along the lines 4—4 of FIG. 3.
Figure 3:
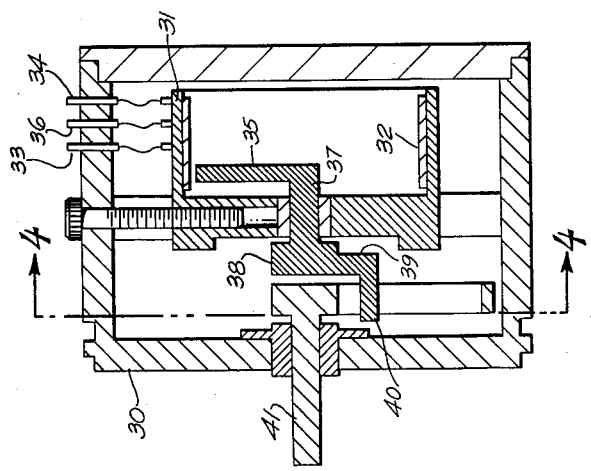
FIG. 3 depicts a longitudinal cross-sectional view of a working arrangement utilizing the principles herein contemplated.

In the foregoing arrangement, as shown in FIG. 2b, the sine wave curve will pass through the 180° point. It is also possible to provide a sinusoidal function which will not pass through the 180° point or even provide a completely different function by changing the geometric configuration of the slot. This is illustrated in FIGS. 5a and 5b, wherein a different type of slotted driving element 52 with a slotted function 53 is shown driving a movable crank handle 60 depending from a crank arm 49 having a vertical slot 51, crank handle 60 moving along the crank arm slot. The resultant function is shown in FIG. 5b. Since the function produced depends on the relationship of the driving shaft 21 or 41 to driven shaft 17 or 37 and the movement of crank handle 20, 40, and 60 in slots 23, 43, 53, other resistance functions can be provided by mechanical slot 53.

It is to be observed therefore that the present invention provides an arrangement for furnishing a mathematical function by means of a standard linear potentiometer which comprises the combination of a cylindrical housing 30 adapted to house a potentiometer 31 therein; a crank element 38 adapted to turn the potentiometer wiper arm; a driving shaft 41 towards the center of said housing disposed in a plane parallel to said potentiometer axis; a driving element 42 on said driving shaft at right angles thereto; a crank handle 40 fastened to one of said elements and engaged in a slot 43 in the other of said elements, whereby the axial disposition of said driving shaft axis with respect to said potentiometer axis and the geometric configuration of said slot determine the mathematical functional resistance variation of said potentiometer. If the desired function is a linear or a sinusoidally increasing function, a simple arrangement is to have the crank handle affixed to the crank element and at the same time have the crank handle retained by a longitudinal straight slot in the driving element. The sinusoidal function can be changed by changing the distance between the driving shaft and the potentiometer axis. Finally, to simplify the present description, it has been stated that a potentiometer has resistance from 0° to 360°. In practice the resistance changes only through about 354°, but this in no way changes the foregoing explanation.

It will be apparent to those skilled in the art, that the present invention is not limited to the specific details described and shown in the drawings, and that various modifications are possible in carrying out the features of the invention and the operation and method of support, mounting, adjustment and utilization thereof, without departing from the spirit and scope of the appended claims.

I claim:

1. An arrangement whereby the resistance value of a potentiometer having a circular resistance element, an axial shaft and a wiper arm rotated by said axial shaft along said resistance element will vary in accordance with a predetermined mathematical function, comprising in combination; a cylindrical housing for holding a potentiometer therein; a crank element to turn the potentiometer wiper arm; a driving shaft towards the center of said housing disposed in a plane parallel to said potentiometer axis; a driving element on said driving shaft at right angles thereto; a crank handle fastened to one of said elements and engaged in a slot in the other of said elements, whereby, the axial disposition of said driving shaft with respect to said potentiometer axis and the geometric configuration of said slot determine the mathematical functional resistance variation of said potentiometer.

2. An arrangement whereby the resistance value of a potentiometer having a circular resistance element, an axial shaft and a wiper arm rotated by said axial shaft along said resistance element will vary in accordance with a predetermined mathematical function, comprising in combination; a cylindrical housing for holding a potentiometer therein; a crank element to turn the potentiometer wiper arm including a crank handle therefor; a driving shaft towards the center of said housing disposed in a plane parallel to said potentiometer axial shaft; a slotted driving element on said driving shaft at right angles thereto said crank handle being engaged in said slot; guide means to maintain said potentiometer axial shaft in a plane parallel to said driving shaft, and screw means to adjust the potentiometer axial shaft relative to the driving shaft, whereby, the axial disposition of said driving shaft with respect to said potentiometer axial shaft and the geometric configuration of said slot determine the mathematical functional resistance variation of said potentiometer.

3. An arrangement whereby the resistance value of a potentiometer having a circular resistance element, an axial shaft and a wiper arm rotated by said axial shaft along said resistance element will vary in accordance with a predetermined sinusoidal function, comprising in combination; a cylindrical housing for holding a potentiometer therein; a crank element to turn the potentiometer wiper arm including a crank handle therefor; a driving shaft towards the center of said housing disposed in a plane parallel to said potentiometer axial shaft; a longitudinally straight slotted driving element on said driving shaft at right angles thereto, said crank handle being engaged in said longitudinal straight slot, whereby the axial disposition of said driving shaft with respect to said potentiometer axial shaft determines the sinusoidal resistance variation of said potentiometer.

References Cited in the file of this patent
UNITED STATES PATENTS

| | | |
|---|---|---|
| 2,429,465 | Jenny | Oct. 21, 1947 |
| 2,862,086 | Bonell | Nov. 25, 1958 |